United States Patent

Burian et al.

[15] 3,681,534

[45] Aug. 1, 1972

[54] CIRCUIT ARRANGEMENT FOR SUPERVISING THE INPUT INFORMATION OF A TRANSLATOR IN TELECOMMUNICATION SYSTEMS AND PARTICULARLY TELEPHONE SYSTEMS

[72] Inventors: Theodor Burian, Ditzingen; Bernhard Krause, Ludwigsburg-Eglosheim, both of Germany

[73] Assignee: International Standard Electric Corporation, New York, N.Y.

[22] Filed: March 10, 1970

[21] Appl. No.: 18,055

[30] Foreign Application Priority Data

March 13, 1969 Germany............P 19 12 625.1

[52] U.S. Cl...............................................179/18 ET

[51] Int. Cl...............................................H04q 3/47

[58] Field of Search....................179/175, 23, 18 ET

[56] References Cited

UNITED STATES PATENTS 3,059,067 10/1962 Gibson....................179/175.23

*Primary Examiner*—William C. Cooper

*Attorney*—C. Cornell Remsen, Jr., Walter J. Baum, Percy P. Lantzy, J. Warren Whitesel, Delbert P. Warner and James B. Raden

[57] ABSTRACT

A translator in a telecommunication system is equipped with input checking means. A supervisory switching means used to check the input to the translator employs a connection to a testing set and in case of trouble, stores any faulty code signals.

8 Claims, 1 Drawing Figure

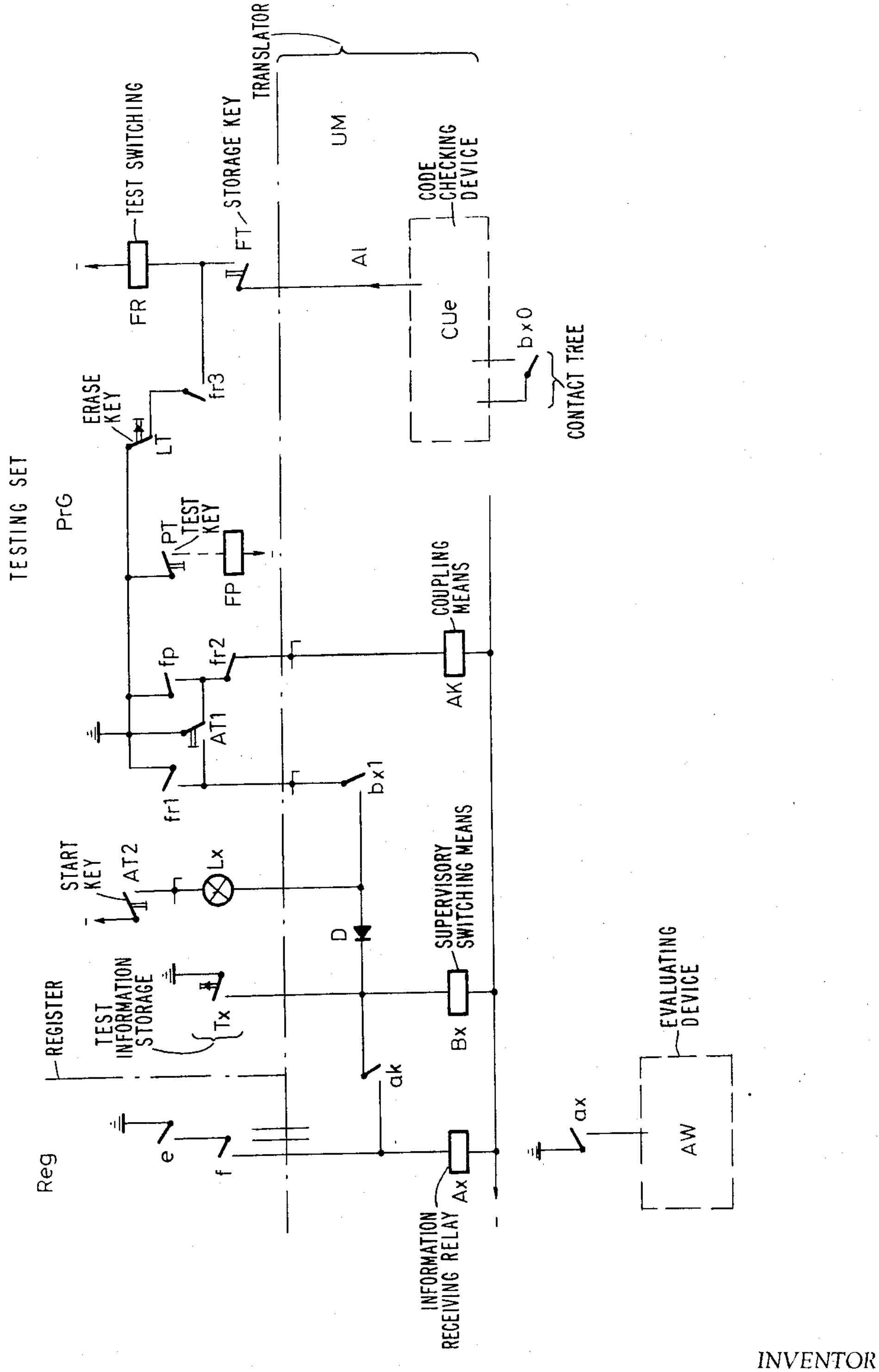
INVENTOR
T. BURIAN - B. KRAUSE
BY *O. B. Warner*
ATTORNEY

CIRCUIT ARRANGEMENT FOR SUPERVISING THE INPUT INFORMATION OF A TRANSLATOR IN TELECOMMUNICATION SYSTEMS AND PARTICULARLY TELEPHONE SYSTEMS

The invention relates to a circuit arrangement for supervising the input information in a translator of a telecommunication system, particularly telephone switching system, whereby faulty input information can be recorded, and which offers the possibility to check the translator via a testing set using test information.

In known arrangements, the checking of the applied code signals is carried out in a well known manner via contacts of the information receiving relay of the translator. If a faulty code signal appears, the applied information is recorded in special switching means of the testing device. Another possibility consists in recording the faulty information in the register seizing the translator, this register remaining seized. With the first possibility, the expenditure per translator in the testing device increases while the second possibility it could easily happen that, due to faults on the junctions to the translator, all registers of a system are successively blocked. For the checking of the translator, the known arrangements are provided with multi-position setting switches or separate storage switching means for the test information. These switching means enable the input of a complete test information before the translator is seized.

An object of the invention is to provide a circuit arrangement for supervising the input information in a translator of a telecommunication system, particularly telephone switching system, which, with little investment in circuitry, enables both the supervision of the input information and the storage of faulty input information without blocking registers of the translator, and, in addition, prestores the test information for checking the translator. According to one aspect of the invention, the circuit arrangement for supervising input information, storing faulty input information, and checking with test information in a translator of a telecommunication system, particularly a telephone switching system, is characterized in that for each input wire there is provided, besides the information receiving switching means, a separate supervisory switching means which can be connected in parallel with said information receiving switching means via a coupling means. The code check is effected in a well known manner via contacts of said supervisory switching means. A test switching means in a testing set can be turned on when a faulty code signal appears. Contacts of said test switching means provide paths via which the faulty code signal is recorded via said supervisory switching means and the coupling between the information receiving means and the supervisory switching means is disconnected. For checking, said supervisory switching means can be preset directly via setting contacts, the holding circuit for said supervisory switching means being closed in preparation and the circuit for the coupling means being interrupted. These additional supervisory switching means can perform the code check, so that the information receiving switching means require fewer contacts. The faulty input information can be recorded by cooperation of the coupling means of the translator and a test switching means in the testing set, the coupling means thereby releasing the translator for further seizure without checking the input information. In the same manner, these supervising switching means of the translator can take over the test information requested by the testing set and transmit this information with the aid of the coupling means to the information receiving switching means of the translator when the translator is seized. It will thus be apparent that with the aid of the new arrangement, all switching/operations desired for the supervision of input information can be performed without any major additional investment.

Details of the new circuit arrangement will become apparent from the following description of an embodiment shown in the accompanying drawing.

The input wires coming from the register Reg are marked in the register via contacts *e* according to the requested information. The contacts *f* establish in a well known manner the connection from a register to the translator UM. If an information is transmitted in the (two out of *n*)-code, in each case two of the *n* wires are marked by contacts *e*. For each position of a multi-position information, the *n* input wires are provided accordingly.

In the translator UM, there is connected to each of these input wires an information receiving switching means AX which passes the information via the contact ax to the evaluating device AW via which an associated output information is derived and returned to the register Reg.

Normally, the coupling means AK of the translator UM is energized via the contacts AT1 of the starting key and *fr*2 of the testing set P*r*G. The contacts ak connect the supervisory switching means B*x* to the input wires, so that the input information is received by these switching means too. The contacts B*x*O of these supervisory switching means B*x* are combined in a well known manner into contact trees and form the code checking device CU*e*. If one position of the input information does not have the required number of markings, i.e., if the code signal is faulty, the test switching means FR in the testing device P*r*G is energized via the code checking device CU*e*, provided that the key FT has been operated. Thus this key initiates the storage of a faulty code signal and is therefore designated as storage key.

If the test switching means FR has operated, this switching means remains energized via its own contact *fr*3 until the erase key LT is operated. The contact *fr*2 opens the operating circuit for the coupling means AK. The contacts ak break the connection between the information receiving switching means A*x* and the supervisory switching means B*x*. The faulty energized supervisory switching means B*x* are held via the individual holding circuits with the diode D and the contacts *bx*1 and the common contact *fr*1. The faulty input information has been recorded but the translator U*m* can, without checking the input information, still be seized and used. If the starting key AT is operated, the faulty input information is indicated via the indicator lamps L*x*. If the erase key LT is operated, the test switching means FR drops and opens the holding circuits for the supervisory switching means B*x* via the contact *fr*1. The contact *fr*2 completes the operating circuit for the coupling switching means AK which thus again effects the coupling between the information receiving switching means A$x$ and the supervisory switching means. If the translator is seized again, the input information is checked again.

If the translator UM is to be checked, the starting key AT is operated. The coupling means AK is deenergized via the contact AT1. The test information stored via the key contacts T$x$ is directly applied to the supervisory switching means B$x$, so that the latter are set accordingly. The preset test information is indicated via the individual indicator lamps L$x$ which are separated from the control circuit via the diode D and selected via the individual holding circuits with the contact $bx1$ of the supervisory switching means B$x$ and the common contact AT1 of the starting key. After the complete test information has been preset, the test key PT is operated. The switching means FP causes the translator UM to be seized like a register Reg in a manner not shown. During this seizure, the contact $fp$ completes the operating circuit for the coupling means AK. When the contacts ak are closed, the test information preset (in contacts T$x$) in the supervisory switching means B$x$ is taken over from the information receiving switching means A$x$ and further processed as in the case of a normal seizure of the translator. After the resetting of the starting key AT and the test key PT, the preset test information is erased and the coupling means AK again makes available the supervisory switching means B$x$ to the normal checking of input information.

We claim:

1. A circuit arrangement for supervising input information to a translator comprising, information receiving means including switching means, supervisory means including switching means available to be connected in parallel with said information receiving means via coupling means, a code checking circuit coupled to said supervisory means via which a code check of signals received by said supervisory means is effected, test means including switching means forming part of a testing set, said test means operating in response to the appearance of a faulty code signal in said code checking circuit, means recording a faulty code signal via said test means and said supervisory means, means for disconnecting said coupling means from between the information receiving means and the supervisory means to prepare them for checking, means to preset said supervisory means directly via setting contacts, and a holding circuit associated with said supervisory means to maintain the supervisory means in an operated condition.

2. Circuit arrangement according to claim 1 in which the test switching means of the testing set is connected with the code checking device of the translator via a storage key.

3. A circuit arrangement according to claim 1, in which the test means includes relay switching means having a holding circuit, said test means interrupting the operating circuit for the coupling means and closing the holding circuit for all supervisory switching means.

4. A circuit arrangement according to claim 3, in which an erase key is provided for the interruption of the holding circuit of the test switching means.

5. A circuit arrangement according to claim 1, in which a starting key is provided which interrupts the operating circuit for the coupling means and closes the holding circuits for all supervisory switching means.

6. A circuit arrangement according to claim 5, in which individual indicator lamps are coupled to be illuminated over contacts of the starting key and the holding circuits for the supervisory switching means.

7. A circuit arrangement according to claim 6, in which the indicator lamp is decoupled from the associated supervisory switching means and the selecting line coming from the testing set by a diode.

8. A circuit arrangement according to claim 1 in which for the initiation of the check a test key is provided which energizes a switching means which closes an operating circuit for the coupling means when the starting key is operated.

* * * * *